United States Patent
Katagiri

(10) Patent No.: US 8,237,542 B2
(45) Date of Patent: Aug. 7, 2012

(54) KEY SYSTEM

(75) Inventor: Toshiharu Katagiri, Aichi (JP)

(73) Assignee: Kabushiki Kaisha Tokai Denki Seisakusho, Aichi (JP)

( * ) Notice: Subject to any disclaimer, the term of this patent is extended or adjusted under 35 U.S.C. 154(b) by 904 days.

(21) Appl. No.: 11/880,696

(22) Filed: Jul. 24, 2007

(65) Prior Publication Data

US 2008/0024270 A1    Jan. 31, 2008

(30) Foreign Application Priority Data

Jul. 28, 2006 (JP) ................................. 2006-206646

(51) Int. Cl.
- G06F 7/04 (2006.01)
- H04L 9/32 (2006.01)
- B60R 25/04 (2006.01)
- H01H 47/00 (2006.01)

(52) U.S. Cl. ....... 340/5.6; 340/5.61; 307/10.3; 307/10.5
(58) Field of Classification Search .................. 340/5.6, 340/5.61; 307/10.3, 10.5
See application file for complete search history.

(56) References Cited

U.S. PATENT DOCUMENTS

| | | | |
|---|---|---|---|
| 3,876,884 A * | 4/1975 | Housman et al. | 307/10.5 |
| 4,240,516 A * | 12/1980 | Henderson et al. | 180/289 |
| 4,723,121 A * | 2/1988 | van den Boom et al. | 340/5.26 |
| 4,936,123 A | 6/1990 | Matsuda | |
| 5,412,378 A * | 5/1995 | Clemens | 340/5.6 |
| 6,275,141 B1 * | 8/2001 | Walter | 340/5.64 |
| 6,386,007 B1 | 5/2002 | Johnson et al. | |
| 7,034,658 B2 * | 4/2006 | Hayashi et al. | 340/5.72 |
| 7,227,446 B2 | 6/2007 | Kumazaki et al. | |
| 2002/0133716 A1 * | 9/2002 | Harif | 713/201 |
| 2004/0222699 A1 * | 11/2004 | Bottomley | 307/9.1 |
| 2006/0139146 A1 * | 6/2006 | Ito et al. | 340/5.31 |
| 2006/0150696 A1 | 7/2006 | Eychenne et al. | |
| 2007/0227866 A1 * | 10/2007 | Dimig | 200/302.2 |

FOREIGN PATENT DOCUMENTS

| | | |
|---|---|---|
| DE | 43 24 762 A1 | 2/1995 |
| EP | 1 674 355 A1 | 6/2006 |
| JP | 06-167148 | 6/1994 |
| JP | 2001-076102 | 3/2001 |
| JP | 2004-025937 | 1/2004 |
| JP | 2004-114890 | 4/2004 |
| JP | 2005-083011 | 3/2005 |

(Continued)

Primary Examiner — Jennifer Mehmood
Assistant Examiner — Andrew Bee
(74) Attorney, Agent, or Firm — Patterson Thuente Christensen Pedersen, P.A.

(57) ABSTRACT

A key system includes a first authentication part configured to perform first authentication for determining whether or not a unique key code of a key is registered in the operation subject and to permit an operation subject to operate in a state in which a first group of functions is operative when the first authentication generates an affirmative result. A wireless signal receiver is configured to receive a medium code unique to a portable communicable data medium through wireless communication. A second authentication part is configured to perform second authentication for determining whether or not the medium code received by the wireless signal receiver is registered in the operation subject. A condition-imposing part is configured to limit operative functions of the operation subject to a second group of functions that is more limited than the first group of functions when at least either one of the first authentication and the second authentication generates a negative result.

14 Claims, 7 Drawing Sheets

FOREIGN PATENT DOCUMENTS

| | | |
|---|---|---|
| JP | 2005-306073 | 11/2005 |
| JP | 2006-103387 | 4/2006 |
| WO | WO 03 002385 A1 | 1/2003 |
| WO | WO 2006/058583 A1 | 6/2006 |

* cited by examiner

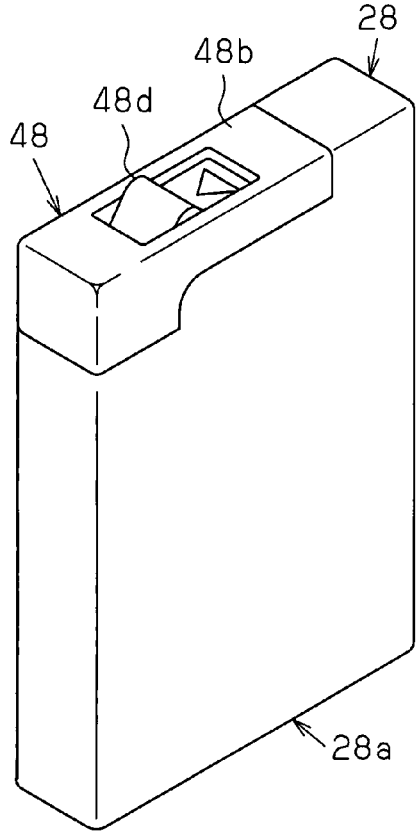
Fig.7A
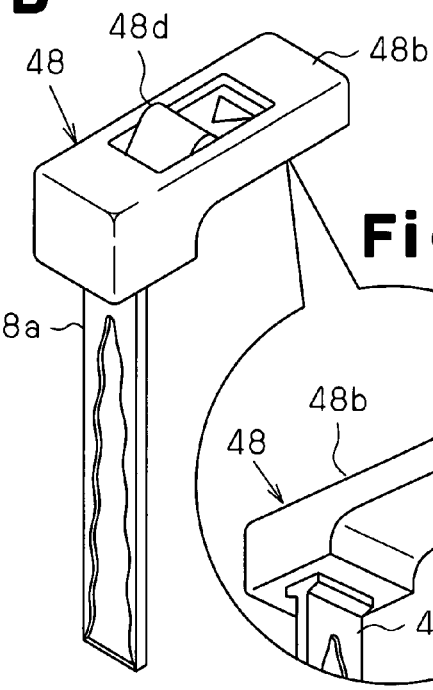
Fig.7B
Fig.7C
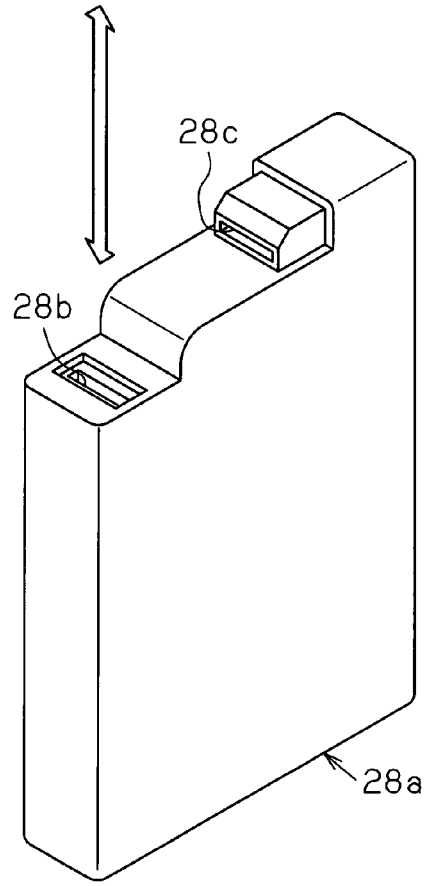

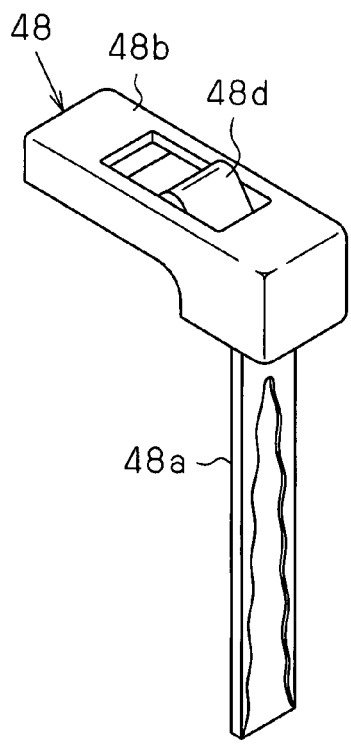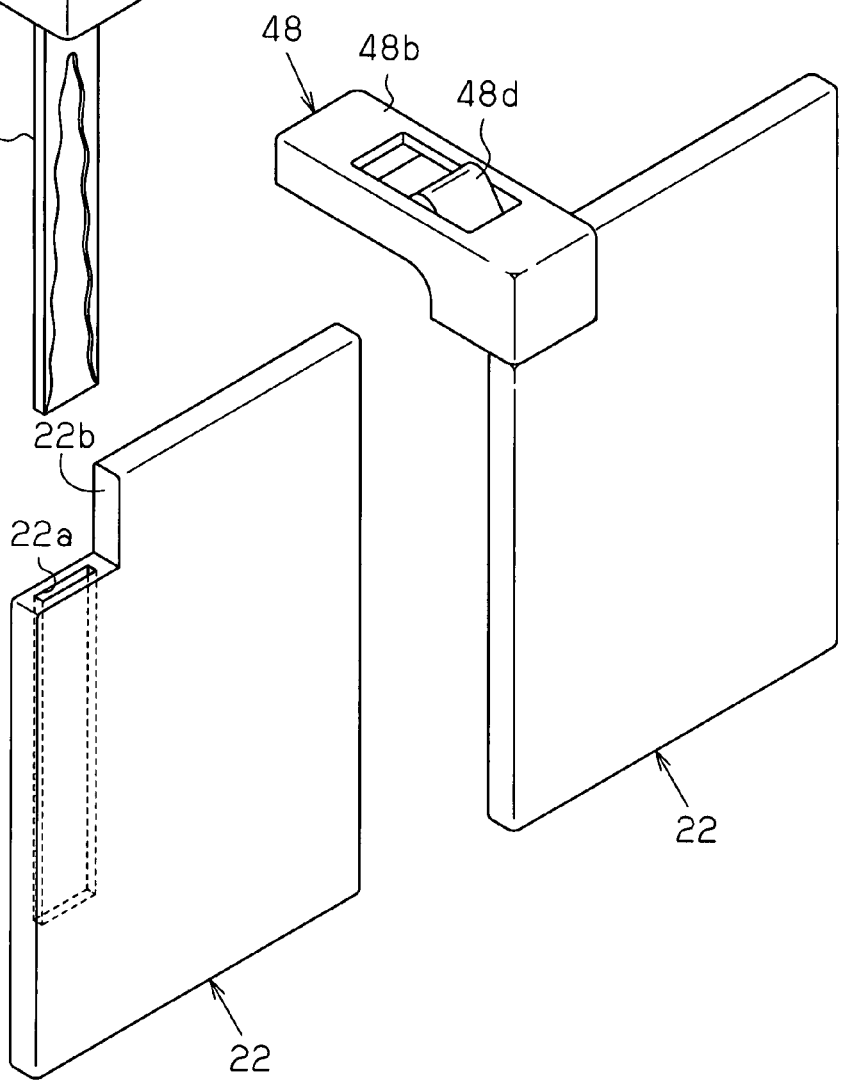

KEY SYSTEM

CROSS-REFERENCE TO RELATED APPLICATIONS

This application is based upon and claims the benefit of priority from prior Japanese Patent Application No. 2006-206646, filed on Jul. 28, 2006, the entire contents of which are incorporated herein by reference.

BACKGROUND OF THE INVENTION

The present invention relates to a key system for activating a lock device by, for example, performing a mechanical operation with a mechanical key or a wireless communication operation with an electronic key.

Conventional keys for a vehicle include a master mechanical key and a sub-mechanical key (for example, refer to Japanese Laid-Open Patent Publication No. 6-167148). The master mechanical key is mainly used by the vehicle owner. The sub-mechanical key is used when the master mechanical key is not on hand. The conventional master mechanical key may be used to lock and unlock any lock in the vehicle, whereas the use of the sub-mechanical key is conditional. Thus, the sub-mechanical key cannot lock and unlock every lock in the vehicle. For example, the sub-mechanical key cannot lock and unlock a glove compartment in the vehicle. Such conditional use of the sub-mechanical key effectively prevents, for example, a third party from removing valuables from the glove compartment without the vehicle owner's permission.

For example, when using a valet parking service, the vehicle owner carries the master mechanical key and gives the sub-mechanical key to the parking attendant so that the parking attendant can operate the vehicle with the sub-mechanical key. The use of the sub-mechanical key is conditional. That is, the sub-mechanical key cannot lock and unlock the glove compartment. Thus, the parking attendant cannot open the glove compartment or the trunk of the vehicle. In this manner, a sub-mechanical key with such a condition-imposing function effectively improves security and prevents valuables in the glove compartment or the trunk from being stolen.

In recent years, an electronic key system, which does not require the vehicle owner to perform a key operation, may be installed in a vehicle (refer to Japanese Laid-Open Patent Publication No. 2004-025937). The electronic key system performs wireless communication so that when the vehicle transmits a request signal, an electronic key carried by the vehicle owner transmits its ID code in response. The vehicle receives the ID code of the electronic key through wireless communication and determines whether the ID code of the electronic key matches the ID code of the vehicle. When the two ID codes match, the vehicle locks or unlocks its door lock and enables the engine to be started.

If the glove compartment of the vehicle does not have a wirelessly communicable lock unit, the electronic key (portable remote controller) of the vehicle cannot be used to lock and unlock the glove compartment. To lock and unlock the glove compartment, a mechanical key that functions as a master key must be prepared.

When using a valet parking service, the vehicle owner must always carry both the master key and the sub-key so that the parking attendant can use the sub-key. This is inconvenient since the vehicle owner must always carry two keys.

When a sub-key is not provided for an electronic key, the vehicle owner must register a new ID code with the vehicle to prepare a sub-key before using the valet parking service. Accordingly, the vehicle owner must carry a plurality of vehicle keys.

SUMMARY OF THE INVENTION

The present invention provides a key system that eliminates the need for carrying a plurality of keys including a key that imposes conditional use when entrusting a third party with the key to drive the vehicle.

One aspect of the present invention is a key system for an operation subject having a plurality of functions. The key system includes a first authentication part that performs first authentication for determining whether or not a unique key code of a key is registered in the operation subject and permits the operation subject to operate in a state in which a first group of functions is operative when the first authentication generates an affirmative result. A wireless signal receiver receives a medium code unique to a portable communicable data medium through wireless communication. A second authentication part performs second authentication for determining whether or not the medium code received by the wireless signal receiver is registered in the operation subject. A condition-imposing part for limiting operative functions of the operation subject to a second group of functions that is more limited than the first group of functions when at least either one of the first authentication and the second authentication generates a negative result.

According to one aspect of the present invention, if the vehicle owner has both the key and the communicable data medium on hand when operating the operation subject, first authentication performed with the key and second authentication performed with the communicable data medium are both successful. In this case, the vehicle owner can operate the operation subject in a normal manner. If the vehicle owner does not have either one of the key and the communicable data medium on hand, the first authentication or the second authentication is unsuccessful. In this case, conditional operation of the operation subject is permitted.

The vehicle owner, who is supposed to be carrying both the key and the communicable data medium, may operate the operation subject in a normal manner. When having a third party operate the operation subject, the vehicle owner lends either the key or the communicable data medium to the third party. Conditions are imposed on either one of the key and the communicable data medium for operating the operation subject. This prevents the third party from using the operation subject in an unconditional manner and improves the security of the operation subject.

The condition-imposing part permits the operation subject to operate in a conditional manner or an unconditional manner when at least the first authentication generates an affirmative result.

One embodiment of the present invention uses the key, which is usually carried by the vehicle owner, and the communicable data medium, which is installed in the operation subject in advance, to permit a person borrowing the key to use the operation subject in a conditional manner. This eliminates the need for the vehicle owner having to always carry two keys, that is, the master key and the sub-key, and improves convenience from the aspect of key portability. Further, the vehicle owner does not need to incorporate the sub-key into the master key. Thus, the master key does not have to be enlarged.

Operation of the operation subject is not permitted when the first authentication performed with the key is unsuccessful and only the second authentication performed with the communicable data medium is successful. The key that is always carried by the vehicle owner may easily be stolen. Thus, the present invention is effective for preventing unauthorized use of the operation subject.

The key system of one embodiment of the present invention further includes a holding mechanism, arranged in the operation subject, for removably holding the communicable data medium. This reduces the possibility of the communicable data medium becoming lost and further reduces the possibility of a communication failure occurring between the operation subject and the communicable data medium.

The key system of one embodiment of the present invention further includes a detector for detecting that the communicable data medium is being held by the holding mechanism. A communication control part starts wireless reception of the medium code in response to a detection signal from the detector indicating that the communicable data medium is held by the holding mechanism. According to one embodiment of the present invention, the communicable data medium returns the medium code in response to a transmission signal from the operation subject. Thus, the communicable data medium does not need to include, for example, a switch operated when the signal is transmitted. This enables the size of the communicable data medium to be reduced and decreases the number of components of the communicable data medium.

In the key system of one embodiment of the present invention, the communication control part transmits, from a wireless signal transmitter, a drive radio wave for driving the communicable data medium in response to a detection signal indicating that the communicable data medium is held by the holding mechanism. The communicable data medium is activated in response to the drive radio wave, uses the drive radio wave as a power supply, and transmits the medium code to the operation subject. Thus, the communicable data medium does not need a power supply. This enables further reduction of the size of the communicable data medium and decreases the number of components of the communicable data medium.

In the key system of one embodiment of the present invention, the key is a mechanical key having a key plate. The key code is a key groove formed on the key plate. The operation subject includes a key cylinder rotated when receiving the key plate. The first authentication part performs, as the first authentication, mechanical operation authentication for determining whether or not the key groove of the mechanical key inserted in the key cylinder corresponds to the key cylinder. According to one embodiment of the present invention, even when a third party tries to operate the operation subject with the master key, conditions are imposed to the use of the operation subject. The vehicle owner is simply required to remove the communicable data medium from the operation subject and carry the communicable data medium and may lend the master key to the third party. With the mechanical key of the prior art, when lending a key to a third party, a sub-key that imposes conditions on the use of the vehicle would be lent to the third party. Thus, the vehicle owner would be required to carry two keys, that is, the master key and the sub-key. However, the present invention eliminates the need for carrying the sub-key. Thus, the vehicle owner does not have to always carry the two keys, that is, the master key and the sub-key.

In the key system of one embodiment of the present invention, the key includes a contactless communication tag that is activated in response to a drive radio wave from the operation subject and wirelessly transmits, as the key code, a second key code differing from the key groove. The first authentication part performs, as the first authentication, the mechanical operation authentication and determination of whether or not the second key code is registered in the operation subject. According to one embodiment of the present invention, two conditions are used to determine that the first authentication is successful, namely the key groove of the mechanical key and the second key code transmitted from the mechanical key. As compared with when, for example, only the key groove is used as the condition for determining whether the authentication is successful, the accuracy for determining whether the key is authorized increases. This improves security and prevents unauthorized use of the vehicle.

In the key system of one embodiment of the present invention, the key is an electronic key including a memory in which the key code is registered and transmits the key code to the operation subject through wireless communication. The first authentication is wireless communication authentication for determining whether the key code received through wireless communication is registered in the operation subject. According to one embodiment of the present invention, operation of the operation subject is enabled through wireless communication performed with the electronic key. This eliminates the need for a mechanical operation in which a key is inserted and turned in a key cylinder to operate such an operation subject. Thus, the operation subject may be operated through a simple operation.

In the key system of one embodiment of the present invention, the electronic key is capable of accommodating a mechanical emergency key including a key plate with a key groove. The operation subject includes a key cylinder rotated when receiving the key plate of the mechanical emergency key. The mechanical emergency key enables a function of the operation subject that is inoperative through wireless communication with the electronic key to be operative. According to one embodiment of the present invention, the mechanical key accommodated in the electronic key may be used to enable operations of the operation subject that cannot be enabled with the electronic key.

In the key system of one embodiment of the present invention, the communicable data medium has an accommodation structure for accommodating the key plate and holding the mechanical emergency key. According to one embodiment of the present invention, the mechanical key removed from the electronic key can be accommodated in the communicable data medium. This reduces the possibility of the removed mechanical key becoming lost.

In the key system of one embodiment of the present invention, the operation subject includes a lockable accommodation case having an accommodation compartment for accommodating the holding mechanism. The accommodation case is unlocked when the result of the first authentication is affirmative. According to one embodiment of the present invention, the communicable data medium is arranged in a locked accommodation case. The accommodation case cannot be unlocked without a key. This reduces the possibility of the communicable data medium being stolen by a third party.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 7A is a perspective view showing an emergency key in a state inserted in a key body of a portable remote controller;

FIG. 7B is a perspective view showing the emergency key in a state removed from the key body of the portable remote controller;

FIG. 7C is a bottom perspective view showing the emergency key of FIG. 7B;

FIG. 8A is a perspective view showing the emergency key in a state prior to insertion into an ID card;

FIG. 8B is a perspective view showing the emergency key in a state subsequent to insertion into the ID card;

DETAILED DESCRIPTION OF THE PREFERRED EMBODIMENTS

A key system according to a first embodiment of the present invention will now be described in detail with reference to FIGS. 1 to 5.

Figure 1:
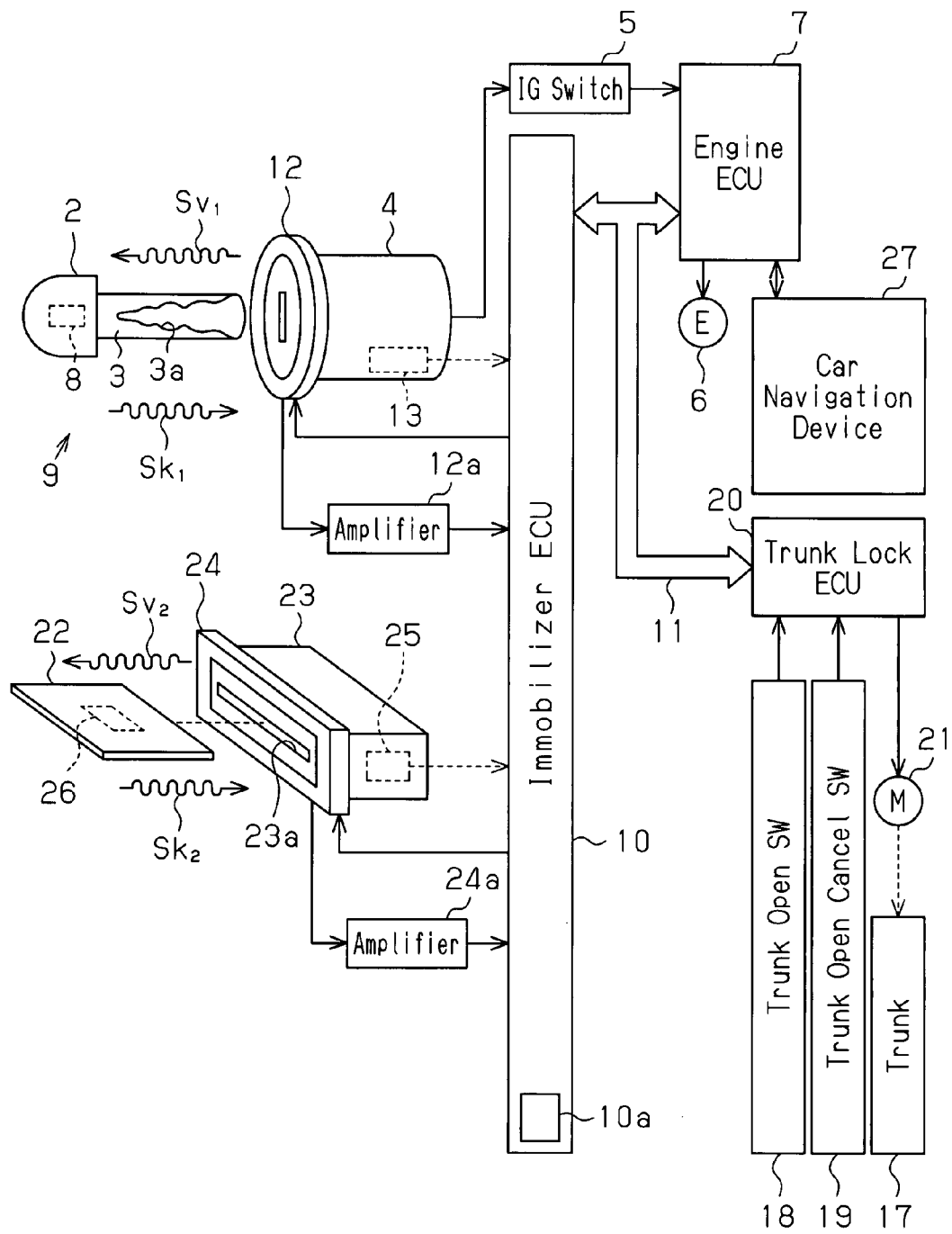
FIG. 1 is a block diagram of a key system according to a first embodiment of the present invention.

As shown in FIG. 1, a vehicle 1 has a key cylinder 4 located near a steering wheel in the passenger compartment. A mechanical key 2, which corresponds to a typical master key, is used to perform various operations in the vehicle 1 (lock and unlock doors, start an engine, lock and unlock a glove compartment, and open a trunk lid). The vehicle 1 is one example of an operation subject of the present invention. The mechanical key 2 is one example of a key of the present invention.

The key cylinder 4 is connected to an ignition (IG) switch 5 that is electrically connected to accessories (not shown) and an engine ECU (electronic control unit) 7. If the mechanical key 2 is an authorized key, that is, if the mechanical key 2 has a key plate 3 including a proper key groove 3a (key code) 3a, the key cylinder 4 permits the mechanical key 2, when inserted in the key cylinder 4, to be turned to four positions, an off position, an ACC position, an IG position, and an engine start position. The position to which the mechanical key 2 is turned determines the switching state of the ignition switch 5.

The engine ECU 7, which controls the engine 6 and executes ignition control and fuel injection control on the engine 6, is connected to the key cylinder 4 via the ignition switch 5. When the authorized mechanical key 2 is turned to the engine start position, a starter relay of the ignition switch 5 goes on, and the engine ECU 7 starts the engine 6.

An immobilizer system 9 is installed in the vehicle 1. The immobilizer system 9 uses a first transponder 8 embedded in the mechanical key 2 to perform ID authentication through wireless communication. The immobilizer system 9 includes an immobilizer ECU 10, which performs the ID authentication. The immobilizer ECU 10 is connected to the engine ECU 7 via an in-vehicle bus 11.

A first coil antenna 12 wound around the key cylinder 4 is connected to the immobilizer ECU 10 via an amplifier 12a. The key cylinder 4 includes a key switch 13. The key switch 13 is connected to the immobilizer ECU 10. When insertion (partial insertion) of the mechanical key 2 into the key cylinder 4 is detected, the key switch 13 provides the immobilizer ECU 10 with a switch signal. The first transponder 8 is one example of a contactless communication tag of the present invention. In one embodiment, the immobilizer ECU 10 functions as a first authentication part, a second authentication part, a condition-imposing part, a communication control part, and a controller of the present invention.

In response to the switch signal from the key switch 13, the immobilizer ECU 10 intermittently transmits a first drive radio wave Sv1 from the first coil antenna 12. The first transponder 8 receives the first drive radio wave Sv1. The first drive radio wave Sv1 energizes or powers the first transponder 8 so that the first transponder transmits to the vehicle 1 a first transponder signal Sk1 including a first transponder code (a key code or a second key code) unique to the mechanical key 2. The immobilizer ECU 10 receives the first transponder signal Sk1 and compares the first transponder code with a transponder code registered in the vehicle 1 to perform key transponder authentication.

When the immobilizer ECU 10 notifies the engine ECU 7 that the key transponder authentication has been successful, the engine ECU 7 provides an encryption code of the engine ECU 7 to the immobilizer ECU 10. The immobilizer ECU 10 receiving the encryption code from the engine ECU 7 refers to the encryption code to determine whether the engine ECU 7 is associated with the immobilizer ECU 10. When these authentication processes are successful, the immobilizer ECU 10, for example, sets a key transponder authentication success flag F1 at a predetermined address of a memory 10a in the immobilizer ECU 10. The immobilizer ECU 10 then deactivates the immobilizer lock with the first transponder 8 to enable the starting of the engine 6.

Figure 2A:
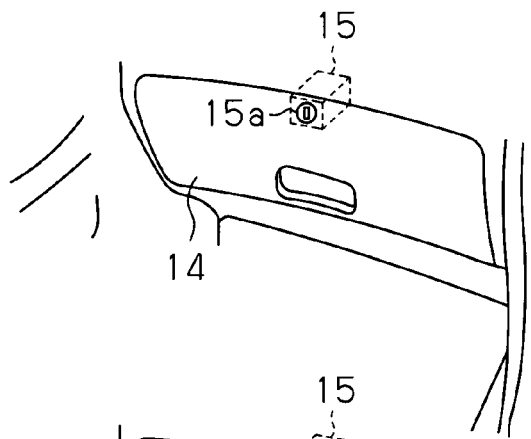
FIG. 2A is a perspective view showing a glove compartment in an unlocked state.
Figure 2B:
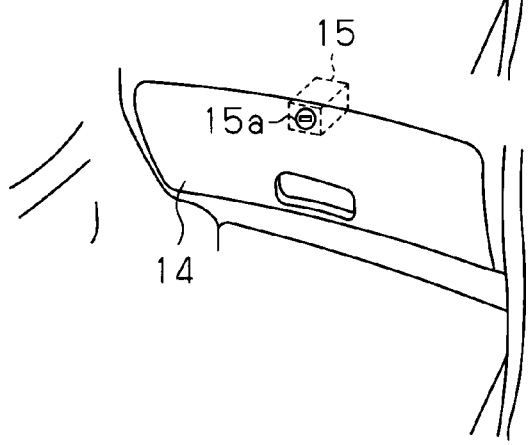
FIG. 2B is a perspective view showing the glove compartment in a locked state.

FIG. 2 shows a glove compartment 14 defining an accommodation space in front of a front passenger seat in the passenger compartment. The glove compartment 14 includes a cylinder lock 15 for locking and unlocking the glove compartment 14. The cylinder lock 15 is unlocked when, for example, its key hole 15a, which is an elongated groove, extends vertically as shown in the state of FIG. 2A. The cylinder lock 15 is locked state (FIG. 2B) by inserting the mechanical key 2 into the key hole 15a, turning the key hole 15a with the mechanical key 2 in the clockwise direction by, for example, 90 degrees, and removing the mechanical key 2 from the cylinder lock 15. The glove compartment 14 including the cylinder lock 15 is one example of an accommodation case of the present invention.

Figure 3:
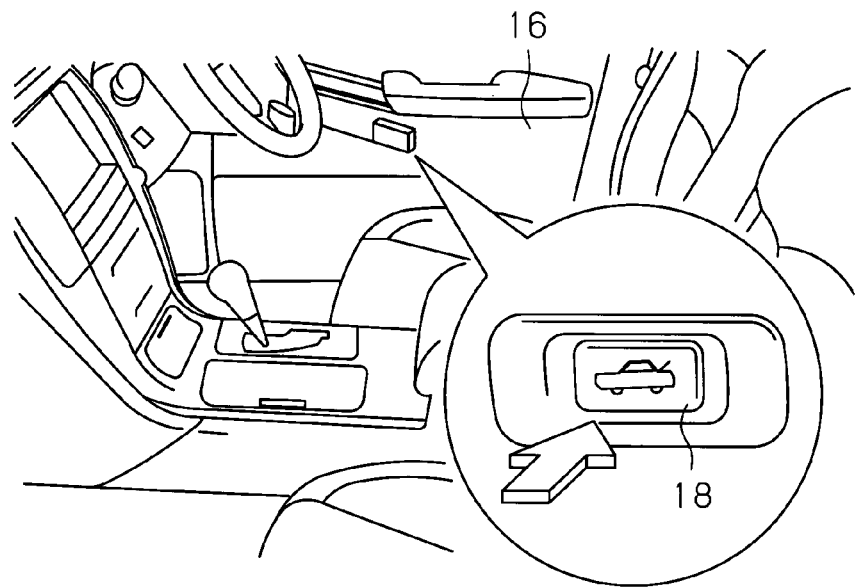
FIG. 3 is a perspective view showing the vicinity of a driver seat in the passenger compartment.

FIG. 3 shows a trunk open switch 18 arranged on an inner side surface of a driver seat door 16. The trunk open switch 18 is operated to open (completely open) a trunk lid 17 (refer to FIG. 1). The trunk open switch 18 is, for example, a push switch that goes on when pushed. When the trunk open switch 18 is pushed in a state in which the trunk lid 17 is closed, the trunk open switch 18 unlocks a trunk lock device. This lifts the trunk lid 17 with a gas cylinder or the like and automatically opens the trunk lid 17.

Figure 4:
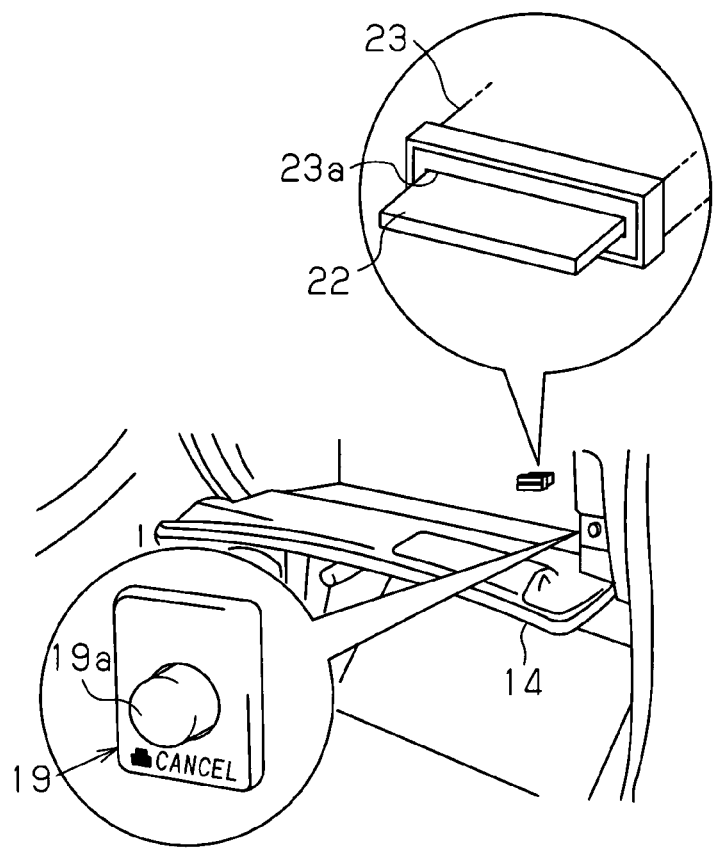
FIG. 4 is a perspective view showing a trunk open cancel switch and a card receptacle arranged in the glove compartment.

As shown in FIG. 4, a trunk open cancel switch 19 is arranged in the glove compartment 14. The trunk open cancel switch 19 prohibits the opening of the trunk lid 17 (refer to FIG. 1). The trunk open cancel switch 19 is a push switch that alternately goes on and off whenever the trunk open cancel switch 19 is pushed. The trunk open cancel switch 19 is on when, for example, a button 19a is in a projected state. In this state, the trunk open cancel switch 19 does not allow the trunk lid 17 to automatically open when the trunk open switch 18 is operated. The trunk open cancel switch 19 goes off when, for example, the button 19a is pushed to a retracted state. In this state, the trunk open cancel switch 19 enables the trunk lid 17 to automatically open when the trunk open switch 18 is operated.

As shown in FIG. 1, the vehicle 1 includes a trunk lock ECU 20 for controlling the trunk lock device. The trunk lock ECU 20 is connected to the immobilizer ECU 10, via the in-vehicle bus 11, and a trunk lock motor 21, which drives the trunk lock device. The trunk lock ECU 20 locks and unlocks the trunk lock device by controlling the trunk lock motor 21 based on switch signals transmitted from the trunk open switch 18 and the trunk open cancel switch 19.

FIG. 4 shows an ID card 22 for performing ID authentication with the vehicle 1 through wireless communication. This ID authentication differs from the authentication performed with the mechanical key 2. The ID card 22 is inserted in a slot 23a of a card receptacle 23 arranged in the glove compartment 14. The ID card 22 can be removed from the slot 23a of the card receptacle 23. The ID card 22 can be flat and can have a portable size. The ID card 22 is one example of a communicable data medium or a removable data storage medium having a data communication function of the present invention. The card receptacle 23 is one example of a holding mechanism or a media reader of the present invention.

As shown in FIG. 1, a second coil antenna 24 wound along the card receptacle 23 is connected to the immobilizer ECU 10 via an amplifier 24a. The card receptacle 23 has a card switch 25 for detecting insertion (partial insertion) of the ID card 22 into the card receptacle 23. The card switch 25 is connected to the immobilizer ECU 10. The ID card 22 includes a second transponder 26. A second transponder code (medium code), which differs from the code of the first transponder 8 is registered or stored in the second transponder 26 of the ID card 22. The second coil antenna 24 is one example of a wireless signal receiver and a wireless signal transmitter of the present invention.

When detecting that the ID card 22 has been inserted in the card receptacle 23 based on a switch signal from the card switch 25, the immobilizer ECU 10 intermittently transmits a second drive radio wave Sv2 from the second coil antenna 24. The second drive radio wave Sv2 energizes or powers the second transponder 26 so that the second transponder 26 transmits a second transponder signal Sk2 including the transponder code of the second transponder 26 to the vehicle 1. When receiving the transponder code, the immobilizer ECU 10 compares the transponder code of the ID card 22 with a transponder code registered in the vehicle 1 to authenticate the ID card. When the ID card authentication is successful, the immobilizer ECU 10 sets, for example, an ID card authentication success flag F2 at a predetermined address of the memory 10a so that the successful ID card authentication can be recognized.

When the ID authentication of the ID card 22 is unsuccessful, the immobilizer ECU 10 imposes conditions that restrict the functions of the vehicle 1 that can be performed. In this case, when, for example, a third party tries to start the engine 6 with the mechanical key 2 to drive the vehicle 1, unless the ID card 22 is inserted in the card receptacle 23, the immobilizer ECU 10 imposes conditions restricting the vehicle functions so that the third party cannot drive the vehicle 1 in an unconditional manner. The card switch 25 is one example of a detector of the present invention.

The operation of the key system will now be described.

First, when the vehicle owner or an authorized user of the vehicle 1 intends to drive the vehicle 1, the vehicle owner (or the authorized user) inserts the ID card 22 in the card receptacle 23, which is arranged in the glove compartment 14. If the cylinder lock 15 of the glove compartment 14 is locked, to insert the ID card 22 in the card receptacle 23, the vehicle owner unlocks the cylinder lock 15 with the mechanical key 2 and opens the glove compartment 14.

When detecting insertion of the ID card 22 in the card receptacle 23 based on a switch signal from the card switch 25, the immobilizer ECU 10 intermittently transmits the second drive radio wave Sv2 from the second coil antenna 24 and performs ID card authentication with the second transponder 26, which is embedded in the ID card 22. The immobilizer ECU 10 sets the ID card authentication success flag F2 in the memory 10a when the transponder code of the second transponder 26 matches the transponder code of the vehicle 1, that is, when the ID card authentication is successful.

To start the engine 6, the vehicle owner inserts the mechanical key 2 into the key cylinder 4. When detecting insertion of the mechanical key 2 in the key cylinder 4 with the key switch 13, the immobilizer ECU 10 intermittently transmits the first drive radio wave Sv1 from the first coil antenna 12 to perform the key transponder authentication with the first transponder 8, which is embedded in the mechanical key 2. The immobilizer ECU 10 sets the key transponder authentication success flag F1 in the memory 10a when determining that the transponder code of the first transponder 8 matches the transponder code of the vehicle 1, that is, when the key transponder authentication is successful.

When determining that the key transponder authentication and the ID card authentication are both successful, the immobilizer ECU 10 notifies the engine ECU 7 that the two authentication processes have been successful. The engine ECU 7 receiving the notification of the successful authentication processes is set in an engine start standby state. In this state, there are no driving conditions imposed on the vehicle 1. The flags F1 and F2 may, for example, be cleared when the immobilizer ECU 10 notifies the engine ECU 7 of the results of the authentication processes.

When inserted in the key cylinder 4, the mechanical key 2 can be turned as long as the key groove 3a of the mechanical key 2 engages tumblers (not shown) in the key cylinder 4, that is, when the key groove authentication (mechanical operation authentication) is successful. When the mechanical key 2 inserted in the key cylinder 4 is turned to the engine start position, the starter relay of the ignition switch 5 goes on. When detecting the activation of the starter relay, the engine ECU 7 checks whether notifications on the authentication processes have been received from the immobilizer ECU 10. When notifications from the immobilizer ECU 10 indicate that the two authentication processes have been successful, the engine ECU 7 determines that the ID card 22 inserted in the card receptacle 23 is the authorized ID card. In this case, the engine ECU 7 permits the engine 6 to start without any driving conditions imposed on the vehicle 1.

When using a valet parking service, the vehicle owner opens the glove compartment 14 and removes the ID card 22 from the card receptacle 23. The vehicle owner carries the ID card 22 and gives the mechanical key 2 to the parking attendant. The parking attendant inserts the mechanical key 2 into the key cylinder 4 to start the engine 6. Since the ID card 22 is not inserted in the card receptacle 23, the immobilizer ECU 10 determines that the key transponder authentication is successful but the ID card authentication is unsuccessful.

When determining that the ID card authentication is unsuccessful and only the key transponder authentication is successful, the immobilizer ECU 10 notifies the engine ECU 7 that only the key transponder authentication has been successful. This sets the engine ECU 7 in a conditional engine start standby state with driving conditions imposed on the vehicle 1.

When the mechanical key 2 inserted in the key cylinder 4 is turned to the engine start position, the starter relay of the ignition switch 5 goes on. When detecting activation of the starter relay, the engine ECU 7 checks on notifications on the authentication processes from the immobilizer ECU 10. The engine ECU 7 determines that the ID card 22 has not been inserted in the card receptacle 23 when the notification received from the immobilizer ECU 10 indicates that only the key transponder authentication has been successful. In this case, the engine ECU 7 activates the engine 6 while imposing driving conditions on the vehicle 1. Thus, the parking attendant can drive the entrusted vehicle 1 only under a conditional state.

An example of a driving condition is a limited driving velocity in which the engine ECU 7 limits the maximum driving velocity of the vehicle 1 to a low velocity (e.g., 30 km per hour). Under the limited driving velocity, when the accelerator pedal is depressed and the vehicle velocity reaches a threshold, the engine ECU 7 limits the fuel injection amount to a fixed amount and maintains the fixed amount even if the accelerator pedal is further depressed. This keeps the vehicle velocity low.

A further example of a driving condition is a limited driving range in which the vehicle 1 is permitted to travel only within a predetermined radius about the position where the mechanical key 2 is given to the parking attendant. The vehicle 1 is prohibited from traveling outside the driving range. Under the limited driving range, when detecting that the vehicle 1 has started to move without the ID card 22 in the card receptacle 23, the engine ECU 7 notifies a car navigation device 27 that the vehicle has started to move. The car navigation device 27, which is provided with information on the present location of the vehicle 1 through a global positioning system (GPS) or the like, determines the position from which the vehicle 1 starts to move. The car navigation device 27 continuously monitors the distance of the vehicle 1 from the start position so that the vehicle 1 does not go beyond a maximum distance (e.g., 1 km). When determining that the traveling distance from the start position has gone beyond the maximum distance, the car navigation device 27 notifies the engine ECU 7 that the traveling distance of the vehicle 1 has exceeded the permissible distance. When receiving a notification that the vehicle 1 has traveled beyond the permissible distance, the engine ECU 7 immediately and forcibly stops the engine 6.

Another example of a driving condition is a limited trunk operation in which the trunk lock device is electrically locked. The immobilizer ECU 10 sends the results of the ID authentication processes not only to the engine ECU 7 but also to the trunk lock ECU 20. More specifically, when the key transponder authentication and the ID card authentication are both successful, the immobilizer ECU 10 notifies the trunk lock ECU 20 of the two successful authentication processes. When only the key transponder authentication is successful, the immobilizer ECU 10 notifies the trunk lock ECU 20 of only the successful key transponder authentication.

When the trunk open switch 18 goes on, the trunk lock ECU 20 detects the activation of the trunk open switch 18 and checks notifications of the authentication processes from the immobilizer ECU 10. When the notification indicates that only the key transponder authentication has been successful, the trunk lock ECU 20 prohibits opening of the trunk lid 17. More specifically, when the trunk open switch 18 is pushed without the authorized ID card 22 in the card receptacle 23, the trunk lock ECU 20 prohibits opening of the trunk lid 17 irrespective of the switch state of the trunk open cancel switch 19.

If the notifications indicate that the two authentication processes have been successful when the trunk open switch 18 is operated, the trunk lock ECU 20 determines that the authorized ID card 22 is inserted in the card receptacle 23. In this case, the trunk lock ECU 20 opens the trunk lid 17 in an unconditional manner. More specifically, when the trunk open cancel switch 19 is deactivated when the trunk open switch 18 is operated, the trunk lock ECU 20 drives the trunk lock motor 21 to unlock the trunk lock device. As a result, the trunk lid 17 automatically opens.

When using a valet parking service, the vehicle owner is required to give a vehicle key to the parking attendant. In such a case, the vehicle owner should give the parking attendant a key that imposes conditions to the vehicle functions, such as the conventional sub-key, to improve security and prevent the vehicle or goods in the passenger compartment from being stolen. That is, when using a valet parking service, instead of a master key, the vehicle owner should give the parking attendant a key corresponding to the sub-key that imposes conditions to vehicle functions.

Figure 5:
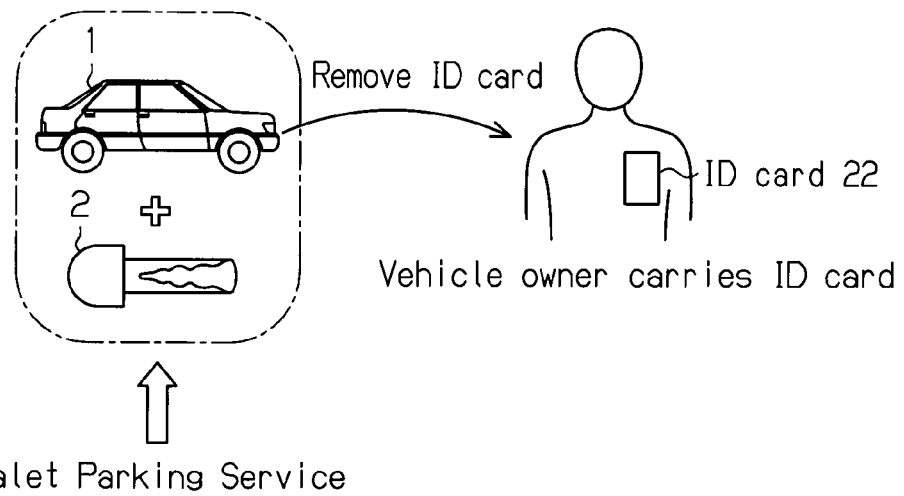
FIG. 5 is a diagram showing a key carried by a vehicle owner when the vehicle owner uses a valet parking service.

Accordingly, when using a valet parking service, the vehicle owner removes the ID card 22 from the card receptacle 23, carries the ID card 22, and leaves the mechanical key 2 with the parking attendant as shown in FIG. 5. After the ID card 22 is removed from the vehicle 1, the ID card authentication becomes unsuccessful. In this state, the vehicle 1 cannot be driven in a normal manner with only the mechanical key 2, which corresponds to a master key. This imposes driving conditions to the vehicle 1 when entrusting a third party with the mechanical key 2 and the vehicle 1.

In the first embodiment, the vehicle owner removes the ID card 22 from the vehicle 1 and leaves the mechanical key 2 with the parking attendant when using a valet parking service. Thus, unlike in the conventional system that requires the vehicle owner to carry both the master key and the sub-key, the structure of the first embodiment eliminates the need for carrying two keys and the inconvenience caused when carrying two keys. Further, the first embodiment does not use a sub-key. This eliminates the need for changing the structure of the mechanical key 2. Since the structure of the mechanical key 2 does not have to be changed, there is no need to enlarge the key structure.

The first embodiment has the advantages described below.

(1) Conditions are imposed on the vehicle only when the mechanical key 2 is used in a state in which the ID card 22 is removed from the card receptacle 23. Thus, when using a valet parking service, the vehicle owner removes the ID card 22 from the card receptacle 23, and carries the ID card 22, and leaves the mechanical key 2 with the parking attendant. Thus, even when using a valet parking service, the vehicle owner does not have to constantly carry two keys, such as a master key and a sub-key. This eliminates the inconvenience caused when there is a need to carry two keys.

(2) The trunk lid 17 is electrically locked when the ID card 22 is removed from the card receptacle 23. Thus, the removal of the ID card 22 from the card receptacle 23 prevents the trunk lid 17 from being opened by a third party without the vehicle owner's permission. This reduces the possibility of goods being stolen from the trunk. Further, the trunk lid 17 is locked immediately when the ID card 22 is removed from the card receptacle 23. This prohibits the opening of the trunk lid 17 without having to operate the trunk open cancel switch 19. Thus, the burden of operating a switch is reduced.

(3) When the ID card 22 is removed from the card receptacle 23, the starting of the engine is enabled. However, driving conditions are imposed on the vehicle 1. For example, the vehicle 1 may not be allowed to travel beyond a radius of 1 km from the position where the key is entrusted to a third party and the maximum velocity of the vehicle 1 may be limited to a low velocity. Thus, even when the vehicle owner uses a valet parking service and leaves the mechanical key 2 with a third party, it would be difficult to steal to the vehicle 1.

(4) The structure using the ID card 22 does not include a sub-key. Thus, there is no need for registering a key with the vehicle 1 and adding the registered key as the sub-key. Accordingly, a plurality of vehicle keys are not necessary, the possibility of a key being stolen is reduced, and the possibility of the vehicle being stolen is reduced.

(5) At least the mechanical key 2 is necessary to start the engine 6. Thus, the engine 6 cannot be started just with the ID card 22. Accordingly, the ID authentication of the mechanical key 2, which is always held by the vehicle owner, is necessary to start the engine 6. This reduces the possibility of the vehicle 1 being stolen.

(6) The ID card 22 is inserted in the card receptacle 23, which is arranged in the glove compartment 14, to keep the ID card 22 in the vehicle 1. Since the ID card 22 is inserted in the card receptacle 23, the possibility of losing the ID card 22 is reduced. Further, communication failures caused by the ID card 22 being located at different position with respect to the second coil antenna 24 do not occur.

(7) The second transponder 26, which includes a unique code of the ID card 22, is energized or powered by the drive radio wave transmitted from the communication subject. Thus, the ID card 22 does not need to include an additional power supply. This enables the ID card 22 to be more compact and reduces the number of components and cost of the ID card 22.

(8) The mechanical key 2 includes the first transponder 8. The engine 6 is started on condition that the key groove authentication performed with the mechanical key 2 and the transponder authentication performed with the first transponder 8 are both successful. This reduces the possibility of unauthorized starting of the engine 6 as compared with when the engine is started on condition that only the key groove authentication is successful.

(9) The glove compartment 14 has the cylinder lock 15. Thus, when locked, the mechanical key 2 is necessary to open the glove compartment 14. This reduces the possibility of the ID card 22 being removed from the card receptacle 23 in the glove compartment 14 in an unauthorized manner.

A second embodiment of the present invention will now be described with reference to FIGS. 6 to 9. Except for the type of key, the second embodiment is similar to the first embodiment.

Figure 6:
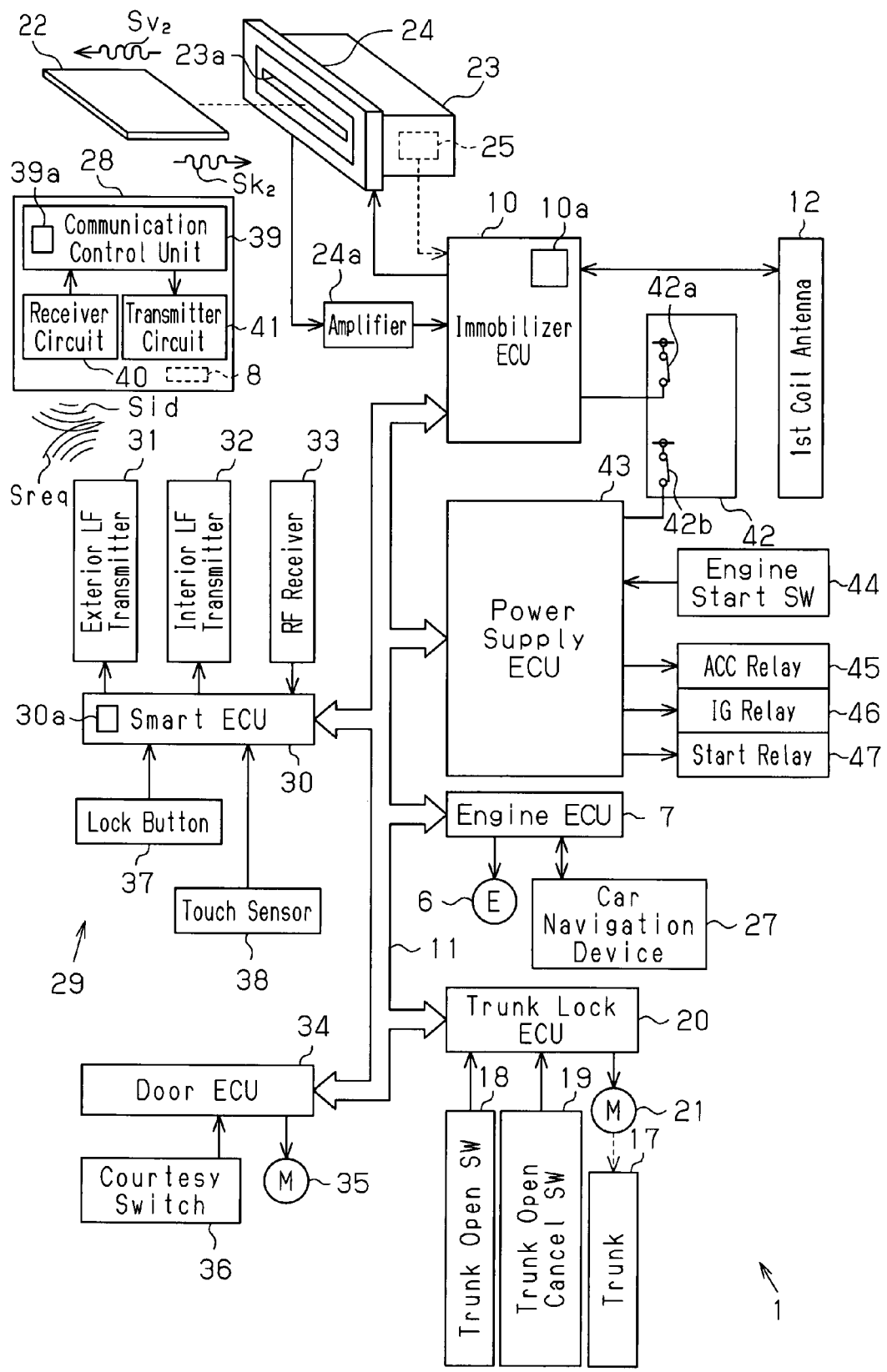
FIG. 6 is a block diagram of a key system according to a second embodiment of the present invention.

Referring to FIG. 6, a hands-free system 29 is installed in a vehicle 1. The hands-free system 29 locks and unlocks a door lock device and enables the starting of an engine without having to carry a mechanical key 2 as long as a portable remote controller 28 is carried. The vehicle 1 includes a smart ECU 30 for performing ID authentication in the hands-free system 29. The smart ECU 30 includes an exterior low-frequency (LF) transmitter 31, an interior LF transmitter 32, and a radio-frequency (RF) receiver 33. The exterior LF transmitter 31 is installed outside the vehicle 1. The interior LF transmitter 32 is installed inside the vehicle 1. The RF receiver 33 is also installed inside the vehicle 1. The portable remote controller 28 is one example of a key (electronic key) of the present invention. The smart ECU 30 is one example of a first authentication part of the present invention.

A door ECU 34 for controlling the locking and unlocking of the door lock device is connected to the smart ECU 30 via an in-vehicle bus 11. A door lock motor 35, which drives the door lock device when the door lock device is locked or unlocked, is connected to the door ECU 34. Further, a door courtesy switch 36, which detects the open or closes state of the door, is connected to the door ECU 34. The door ECU 34 receives an input of an open signal or a close signal from the door courtesy switch 36, and determines whether the door is in an open state or a closed state.

A lock button 37 is provided for a door handle, which is arranged on the outer side of a door. A touch sensor 38 is embedded in the door handle. The lock button 37 and touch sensor 38 are connected to the smart ECU 30. The lock button 37 is a push button. The lock button 37 is pushed when the door lock device is unlocked to lock the door lock device. The touch sensor 38 detects whether the vehicle owner has touched and operated the door handle. When detecting that the vehicle owner has touched and operated the door handle in the locked state of the door lock device, the door lock device is unlocked.

The portable remote controller 28 includes a communication control unit 39. The communication control unit 39 controls wireless communication of the portable remote controller 28 in a centralized manner. A receiver circuit 40 and a transmitter circuit 41 are connected to the communication control unit 39. The receiver circuit 40 receives a signal having a low frequency (LF signal). The transmitter circuit 41 transmits a signal having a radio frequency (RF signal) that is in accordance with a command provided from the communication control unit 39. The receiver circuit 40 demodulates the received LF signal and provides the demodulated signal as reception data to the communication control unit 39. The transmitter circuit 41 transmits an ID signal Sid with a radio frequency including an ID code (key code) of the portable remote controller 28 in accordance with a command provided from the communication control unit 39. A first transponder 8 for transmitting a first transponder code is embedded in the portable remote controller 28.

When the vehicle 1 is in a parked state (the engine being stopped and the doors being locked), the smart ECU 30 transmits a request signal Sreq having a low frequency as an ID transmission request from the exterior LF transmitter 31. This forms an exterior communication area outside the vehicle 1. When the smart ECU 30 includes a plurality of exterior LF transmitters 31, the exterior LF transmitters 31 sequentially transmit the request signal Sreq and repeat such transmission of the request signal Sreq. When the portable remote controller 28 enters the exterior communication area, the portable remote controller 28 receives the request signal Sreq with its receiver circuit 40. When determining that the received LF signal is an ID transmission request, in response, the communication control unit 39 transmits the ID signal Sid having a radio frequency including an ID code, which is registered in a memory 39a of the communication control unit 39, from its transmitter circuit 41.

The smart ECU 30 receives the ID signal Sid with its RF receiver 33 while transmitting the request signal Sreq from the exterior LF transmitter 31 and determines that the exterior communication has been established. The smart ECU 30 then performs, as the ID authentication, exterior authentication by comparing the ID code of the portable remote controller 28 with the ID code registered in the vehicle 1. When determining that the exterior authentication has been successful, the smart ECU 30 activates the touch sensor 38. When the touch sensor 38 detects the vehicle owner touching the door handle, the smart ECU 30 outputs a door unlock request signal to the door ECU 34. The door ECU 34 receiving the door unlock request signal drives the door lock motor 35 and unlocks the door lock device in a locked state.

Upon detection of the lock button 37 being pushed when the door lock device is unlocked, the smart ECU 30 transmits a request signal Sreq from the exterior LF transmitter 31 and determines whether exterior authentication with the portable remote controller 28 is successful. When the smart ECU 30 determines that the exterior authentication has been successful after the lock button 37 is operated, the smart ECU 30 outputs a door lock request signal to the door ECU 34. The door ECU 34 receiving the door lock request signal drives the door lock motor 35 and locks the door lock device.

When detecting with the door courtesy switch 36 that the vehicle owner has entered the vehicle, the smart ECU 30 transmits a request signal Sreq from the interior LF transmitter 32. This forms an interior communication area in the vehicle 1. When the portable remote controller 28 enters the interior communication area, the portable remote controller 28 returns an ID signal Sid in response to the request signal Sreq. The smart ECU 30 receives the ID signal Sid of the portable remote controller 28 with the RF receiver 33 while transmitting the request signal Sreq from the interior LF transmitter 32. In this case, the smart ECU 30 determines that interior communication has been established. The smart ECU 30 then performs, as the ID authentication, interior authentication (wireless communication authentication) by comparing the ID code of the portable remote controller 28, which is located in the passenger compartment, with the ID code registered in the vehicle 1, and determining the result of the interior authentication. When the interior authentication is successful, the smart ECU 30 sets, for example, an interior authentication success flag F3 in the memory 30a for recognition of successful interior authentication.

A portable remote controller receptacle 42 is arranged near a steering wheel in the vehicle 1. The portable remote controller 28 is insertable in the portable remote controller receptacle 42. The portable remote controller receptacle 42 includes a partial-insertion detection switch 42a and a complete-insertion detection switch 42b. The partial-insertion detection switch 42a detects partial insertion of the portable remote controller 28 in the portable remote controller receptacle 42. The complete-insertion detection switch 42b detects complete insertion of the portable remote controller 28 in the portable remote controller receptacle 42. The partial-insertion detection switch 42a and the complete-insertion detection switch 42b are electrically connected to an immobilizer ECU 10. When the portable remote controller 28 is partially inserted in the portable remote controller receptacle 42, the partial-insertion detection switch 42a provides an on signal to the immobilizer ECU 10. When the portable remote controller 28 is completely inserted in the portable remote controller receptacle 42, the complete-insertion detection switch 42b provides an on signal to the immobilizer ECU 10.

A power supply ECU 43 for controlling power supplies for various electric components in the passenger compartment is connected to the smart ECU 30 via the in-vehicle bus 11. An engine start switch 44, which is operated to start or stop an engine 6, is connected to the power supply ECU 43. The engine 6 of the vehicle 1 is started if the engine start switch 44 goes on when the gearshift lever is located at a parking position (P position) and the brake pedal is depressed. An ACC relay 45, an IG relay 46, and an ST relay 47 are connected to the power supply ECU 43. The ACC relay 45 switches the activation and deactivation of accessory power supplies. The IG relay 46 switches the activation and deactivation of the ignition switch. The ST relay 47 energizes and de-energizes the starter motor.

To start the engine 6, the portable remote controller 28 is first inserted in the portable remote controller receptacle 42. The immobilizer ECU 10 detecting that the portable remote controller 28 has been partially inserted in the portable remote controller receptacle 42 performs key transponder authentication (wireless communication authentication) with the first transponder 8, which is embedded in the portable remote controller 28. When the key transponder authentication is successful, the immobilizer ECU 10 sets, for example, a key transponder authentication success flag F1 in a memory 10a for recognition of the successful key transponder authentication. When the portable remote controller 28 is completely inserted in the portable remote controller receptacle 42, the power supply ECU 43 is activated.

If the power supply ECU 43 detects that the engine start switch 44 has been switched on when the gearshift lever is at the parking position and the brake pedal is depressed, the power supply ECU 43 checks the ID authentication results with the immobilizer ECU 10. In this state, the immobilizer ECU 10 deactivates the immobilizer lock when at least the interior authentication and the key transponder authentication have been successful. The immobilizer ECU 10 then transmits the ID authentication results to the power supply ECU 43. The power supply ECU 43 receiving the ID authentication results activates the ACC relay 45, the IG relay 46, and the ST relay 47 when the interior authentication and the key transponder authentication have been successful (or when only the key transponder authentication has been successful such as when the battery of the portable remote controller 28 is drained).

The power supply ECU 43 that has activated the relays outputs an activation signal to the engine ECU 7. The engine ECU 7 receiving the activation signal performs encrypted communication with the immobilizer ECU 10, checks whether the ID authentication has been successful, and checks whether the engine ECU 7 is associated (paired) with the immobilizer ECU 10. When the interior authentication and the key transponder authentication have been successful (or when only the key transponder authentication has been successful such as when the battery of the portable remote controller 28 is drained) and the pairing has been successful, the engine ECU 7 starts the engine 6.

As shown in FIGS. 7A and 7B, an emergency key 48 is accommodated in the portable remote controller 28. The emergency key 48 is a mechanical key used to operate the vehicle 1 through an actual key operation. The emergency key 48 does not perform wireless communication. The emergency key 48 includes a key plate 48a formed from an elongated plate and a handle 48b fixed to an end portion of the key plate 48a. A key body 28a functioning as a case for the portable remote controller 28 has a long and thin key insertion groove 28b extending from end portion in the longitudinal direction of the key body 28a.

As shown in FIG. 7A, the key plate 48a is inserted in the key insertion groove 28b to accommodate the emergency key 48 in the key body 28a of the portable remote controller 28. As a result, the emergency key 48 engages an engagement pin 48c(FIG. 7C), to which biasing force is applied by a spring member (not shown) arranged in the handle 48b. The engagement pin 48c is received in an engagement hole 28c of the key body 28a. To remove the emergency key 48 from the key body 28a of the portable remote controller 28, a tab 48d arranged on an upper surface of the handle 48b is moved as shown in the state of FIG. 7B. As a result, the engagement pin 48c of the emergency key 48 moves against the force of the spring member. This disengages the engagement pin 48c from the engagement hole 28c.

As shown in FIGS. 8A and 8B, an ID card 22 has a key insertion groove 22a shaped in correspondence with the key plate of the emergency key 48. The key insertion groove 22a extends in the longitudinal direction of the ID card 22 to in correspondence with the length of the key plate 48a. The key insertion groove 22a also extends in the widthwise direction of the ID card 22. More specifically, the key insertion groove 22a is shaped in correspondence with the ID card 22 so as to extend in the planar direction of the ID card 22.

The emergency key 48 is removably set on the ID card 22 by pressing the key plate 48a into the key insertion groove 22a of the ID card 22 as shown in the state of FIG. 8B. A step portion 22b is formed by cutting away a corner of the ID card 22 in a manner that an upper end surface of the handle 48b is flush with the end surface of the ID card 22 when the emergency key 48 is set on the ID card 22. The key insertion groove 22a is one example of an accommodation structure of the present invention.

The operation of the key system of the second embodiment will now be described.

To drive the vehicle 1, the vehicle owner first inserts the ID card 22 into a card receptacle 23 arranged in a glove compartment 14. When a cylinder lock 15 of the glove compartment 14 is locked, the cylinder lock 15 cannot be unlocked by wireless communication with the portable remote controller 28. Thus, the vehicle owner removes the emergency key 48 from the portable remote controller 28 and uses the emergency key 48 to unlock the cylinder lock 15 and open the glove compartment 14. The vehicle owner then inserts the ID card 22 into the card receptacle 23.

The immobilizer ECU 10 detects that the ID card 22 has been inserted in the card receptacle 23 with a card switch 25. The immobilizer ECU 10 then intermittently transmits a second drive radio wave Sv2 from a second coil antenna 24 to perform the ID card authentication with the second transponder 26, which is embedded in the ID card 22. When determining that the ID card authentication has been successful, the immobilizer ECU 10 sets an ID card authentication success flag F2 in the memory 10a.

To start the engine 6, the vehicle owner first inserts the portable remote controller 28 into the portable remote controller receptacle 42. When the portable remote controller 28 is partially inserted in the portable remote controller receptacle 42, the immobilizer ECU 10 intermittently transmits a first drive radio wave Sv1 from a first coil antenna 12 and performs the key transponder authentication with the first transponder 8, which is embedded in the portable remote controller 28. When determining that the key transponder authentication has been successful, the immobilizer ECU 10 sets the key transponder authentication success flag F1 in the memory 10a. When the portable remote controller 28 is then completely inserted in the portable remote controller receptacle 42, the power supply ECU 43 is activated.

When detecting that the engine start switch 44 has been pushed in a state in which the gearshift lever is located at the parking position and the brake pedal is depressed, the power supply ECU 43 checks the ID authentication result obtained by the immobilizer ECU 10. In addition to the ID authentication result of the immobilizer ECU 10, the ID authentication result of the smart ECU 30 is also checked. Thus, the results of the interior authentication and the key transponder authentication are sent to the power supply ECU 43. More specifically, the immobilizer ECU 10 sends an engine start enable notification to the power supply ECU 43 when the interior authentication and the key transponder authentication are both successful. The immobilizer ECU 10 sends an engine start disable notification to the power supply ECU 43 when the two authentication processes are both unsuccessful. The power supply ECU 43 activates the relays 45 to 47 when receiving the engine start enable notification and provides an activation signal to the engine ECU 7.

The immobilizer ECU 10 also transmits the ID authentication results to the engine ECU 7 when transmitting the ID authentication results to the power supply ECU 43. More specifically, the immobilizer ECU 10 transmits the results of the interior authentication and the key transponder authentication together with the result of the ID card authentication to the engine ECU 7. As a result, when the interior authentication, the key transponder authentication, and the ID card authentication are each successful, the immobilizer ECU 10 transmits an unconditional engine start enable notification to the engine ECU 7. When the ID card authentication is unsuccessful, the immobilizer ECU 10 transmits a conditional engine start enable notification to the engine ECU 7.

The engine ECU 7 receives the activation signal from the power supply ECU 43. As a result, the engine ECU 7 activates the vehicle 1 in a state determined based on the ID authentication result input from the immobilizer ECU 10. More specifically, the engine ECU 7 activates the vehicle 1 without any conditions imposed on the driving of the vehicle 1 when receiving the unconditional engine start enable notification from the immobilizer ECU 10. The engine ECU 7 permits conditional driving of the vehicle when receiving the conditional engine start enable notification from the immobilizer ECU 10.

When the vehicle owner pushes the engine start switch 44 and performs an engine start operation in a state in which the ID card 22 is inserted in the card receptacle 23, the engine ECU 7 receives an unconditional engine start enable notification from the immobilizer ECU 10. Thus, the engine start operation performed by the vehicle owner starts the engine 6 without the engine ECU 7 imposing any driving conditions on the vehicle 1. In this case, the vehicle owner is permitted to drive the vehicle in a normal manner.

When using a valet parking service, the vehicle owner opens the glove compartment 14, removes the ID card 22 from the card receptacle 23, closes the glove compartment 14, and then removes the emergency key 48 from the portable remote controller 28. Then, the vehicle owner uses the emergency key 48 to lock the cylinder lock 15. This prevents the glove compartment 14 from being open without the vehicle owner's permission. The vehicle owner inserts the emergency key 48 in the key insertion groove 22a of the ID card 22 to integrate the ID card 22 with the emergency key 48. The vehicle owner carries the ID card 22 in which the emergency key 48 has been inserted and leaves the portable remote controller 28 from which the emergency key 48 has been removed with the parking attendant.

The parking attendant receiving the portable remote controller 28 inserts the portable remote controller 28 in the portable remote controller receptacle 42 to start the engine 6. Without the ID card 22 being inserted in the card receptacle 23, the immobilizer ECU 10 determines that the interior authentication and the key transponder authentication have been successful but the ID card authentication has been unsuccessful.

When the engine start switch 44 is pushed in a state in which the gearshift lever is located at the parking position and the accelerator pedal is depressed, the engine ECU 7 receives an authentication result notification from the immobilizer ECU 10. Since the engine ECU 7 receives the conditional engine start enable identification from the immobilizer ECU 10, the engine ECU 7 determines that the ID card 22 has not been inserted in the card receptacle 23. Thus, the engine ECU 7 starts the engine 6 with driving conditions imposed on the vehicle 1. As a result, the parking attendant is permitted to drive the vehicle 1 only under the conditional driving conditions.

Figure 9:
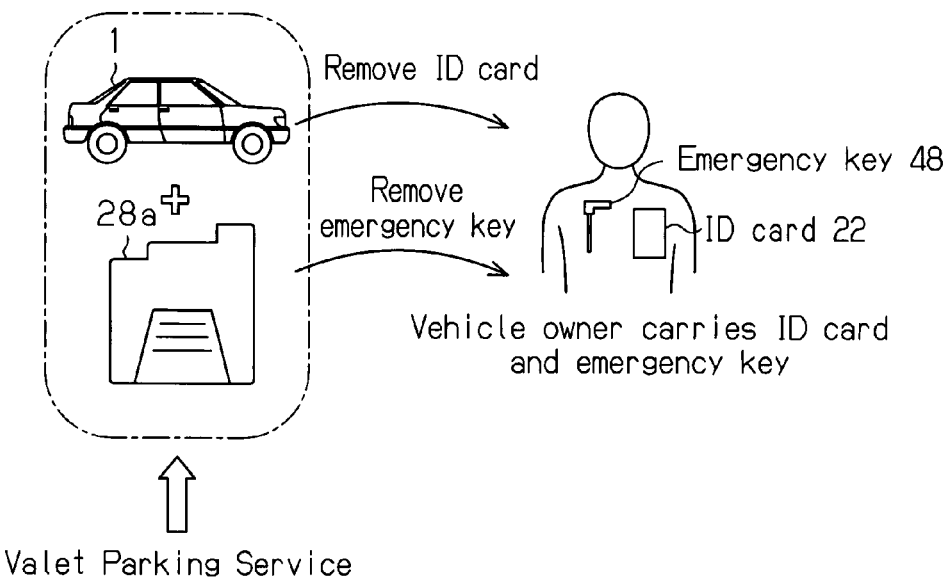
FIG. 9 is a diagram showing a key carried by a vehicle owner when the vehicle owner uses a valet parking service.

Accordingly, even when the hands-free system 29 is installed in the vehicle 1, conditions are imposed on the driving function of the vehicle 1 when the vehicle 1 and the portable remote controller 28 are left with the parking attendant in a state in which the ID card 22 is removed from the card receptacle 23 as shown in the state of FIG. 9. In this case, the parking attendant cannot freely move the vehicle 1. The second embodiment reduces the possibility of the vehicle 1 being stolen by a third party.

In the second embodiment, the emergency key 48 is removed from the portable remote controller 28 before giving the portable remote controller 28 to a parking attendant. Thus, the cylinder lock 15 of the glove compartment 14 cannot be unlocked with the portable remote controller 28 from which the emergency key 48 has been removed. This reduces the possibility of a third party, who is carrying the portable remote controller 28, opening the glove compartment 14 without the vehicle owner's permission and reduces the possibility of valuables from being stolen from the glove compartment 14.

Typically, the mechanical key (emergency key 48) may be used to open the trunk lid 17 irrespective of the activation and deactivation of the trunk open cancel switch 19. However, the vehicle owner leaves the portable remote controller 28 from which the emergency key 48 has been removed with the parking attendant in the second embodiment. This prevents the trunk lid 17 from being opened by the parking attendant without the vehicle owner's permission and prevents valuables from being stolen from the trunk.

The second embodiment has the advantages described below in addition to the advantages described in the first embodiment.

(10) The portable remote controller 28 that performs the ID authentication through wireless communication is used as the vehicle key. This enables the door lock device to be locked and unlocked and the engine to be started without requiring an actual mechanical operation, such as the insertion of the key into the key cylinder and the turning of the key. Thus, the door lock device is locked and unlocked and the engine is started through a simple operation.

(11) The portable remote controller 28 accommodates the emergency key 48. Thus, as long as the vehicle owner is carrying the portable remote controller 28, the glove compartment 14 can be locked and unlocked with the emergency key 48. Further, when using a valet parking service and leaving the portable remote controller 28 with the parking attendant, the vehicle owner just needs to remove the emergency key 48 from the portable remote controller 28. This prevents a third party, including the parking attendant, entrusted with the portable remote controller 28 from opening the glove compartment 14 without the vehicle owner's permission.

(12) The ID card 22 has the key insertion groove 22a. The emergency key 48 removed from the portable remote controller 28 is set on the ID card 22 by inserting the emergency key 48 in the key insertion groove 22a. This reduces the possibility of losing the emergency key 48 that has been removed from the portable remote controller 28.

A third embodiment of the present invention will now be described with reference to FIG. 10. Except for the locking structure of the glove compartment 14, the third embodiment is similar to the first embodiment.

Figure 10:
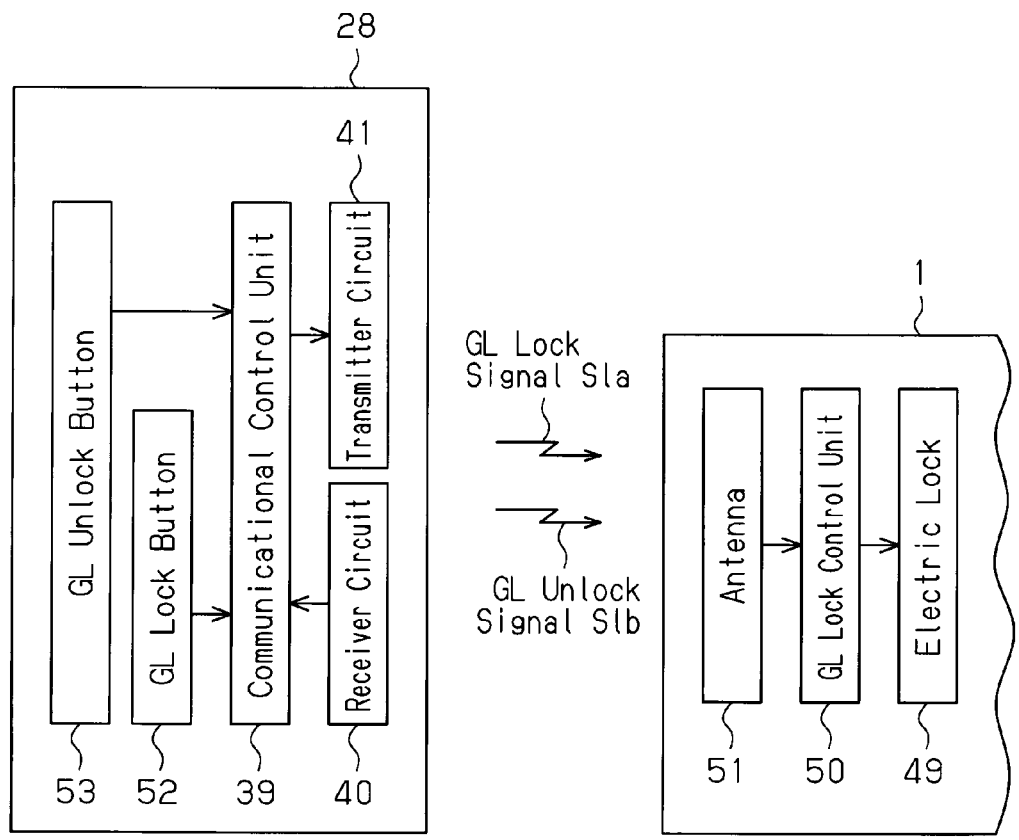
FIG. 10 is a diagram showing the structure of a key system according to a third embodiment of the present invention.

As shown in FIG. 10, the glove compartment 14 includes an electric lock 49 electrically activated to lock and unlock the glove compartment 14. The electric lock 49 is locked when, for example, a motor drives and engages a lock member with an engagement hole of a vehicle body frame. The electric lock 49 is unlocked when the lock member is disengaged from the engagement hole. A glove compartment lock control unit 50 for controlling the locking and unlocking of the electric lock 49 is connected to the electric lock 49. An antenna 51 is connected to the glove compartment lock control unit 50. The antenna 51 receives various RF signals transmitted from a portable remote controller 28 when wireless communication is established with the portable remote controller 28.

The portable remote controller 28 includes a glove compartment lock button 52 and a glove compartment unlock button 53. The glove compartment lock button 52 is operated to lock the glove compartment 14. The glove compartment unlock button 53 is operated to unlock the glove compartment 14. The buttons 52 and 53 are push switches and connected to a communication control unit 39. When the buttons 52 and 53 are pushed, the communication control unit 39 transmits corresponding RF signals (glove compartment lock signal S1a and glove compartment unlock signal S1b) from a transmitter circuit 41.

An immobilizer ECU 10 enables unconditional driving of a vehicle 1 when determining that ID authentication (interior authentication and key transponder authentication) performed with the portable remote controller 28 and ID card authentication have both been successful. The immobilizer ECU 10 enables conditional driving of the vehicle 1 when determining that only the ID authentication, which is performed with the portable remote controller 28, or the ID card authentication has been successful. The glove compartment accommodating the electric lock 49, the glove compartment lock control unit 50, and the antenna 51 is one example of an accommodation case of the present invention.

To drive the vehicle 1, the vehicle owner opens the glove compartment 14 and sets an ID card 22 in a card receptacle 23. After setting the ID card 22 in the card receptacle 23, the vehicle owner closes the glove compartment 14 and pushes the glove compartment lock button 52 of the portable remote controller 28 to lock the glove compartment 14. This prevents the set ID card 22 from being removed by a third party without the vehicle owner's permission. When the glove compartment lock button 52 is pushed, the portable remote controller 28 transmits the glove compartment lock signal S1a. The glove compartment lock control unit 50 receives the glove compartment lock signal S1a via the antenna 51 and locks the electric lock 49.

When detecting that the ID card 22 has been set in the card receptacle 23, the immobilizer ECU 10 performs the ID card authentication with the ID card 22 and determines whether the ID card 22 set in the card receptacle 23 is an authorized card. When the ID card 22 is set in the card receptacle 23, the ID authentication (interior authentication and key transponder authentication) performed with the portable remote controller 28 and the ID card authentication are both successful. Thus, the unconditional driving of the vehicle 1 is enabled.

When using a valet parking service, the vehicle owner leaves either the portable remote controller 28 or the ID card 22 with the parking attendant. In this case, the immobilizer ECU 10 determines that only the ID authentication (the interior authentication and the key transponder authentication)

performed with the portable remote controller 28 or the ID card authentication is successful. Thus, the engine ECU 7 receives a conditional engine start enable notification from the immobilizer ECU 10 when the engine 6 is started. As a result, the engine 6 is started with conditions imposed on the driving functions of the vehicle 1.

When leaving the portable remote controller 28 with the parking attendant, the vehicle owner removes the ID card 22 in the glove compartment 14 from the card receptacle 23 and carries the ID card 22. To remove the ID card 22 from the glove compartment 14, the vehicle owner first pushes the glove compartment unlock button 53 of the portable remote controller 28 to unlock the glove compartment 14. The glove compartment unlock signal S1$b$ is transmitted from the portable remote controller 28. The glove compartment lock control unit 50 receives the glove compartment unlock signal S1$b$ via the antenna 51 and unlocks the electric lock 49. This enables the vehicle owner to open the glove compartment 14. The vehicle owner opens the glove compartment 14 and removes the ID card 22 from the card receptacle 23.

When leaving the ID card 22 with the parking attendant, the vehicle owner leaves the ID card 22 in the card receptacle 23. The vehicle owner carries the portable remote controller 28 and entrusts the parting attendant with the vehicle 1 in which the ID card 22 is inserted in the card receptacle 23. When the glove compartment 14 is locked, the parking attendant cannot remove the ID card 22 from the glove compartment 14 unless operating the portable remote controller 28 to unlock the glove compartment 14. When the vehicle owner does not want the ID card 22 to be removed without the vehicle owner's permission, the vehicle owner may keep the glove compartment 14 locked.

In the third embodiment, the glove compartment 14 is locked and unlocked through wireless communication. This eliminates the need for performing an actual mechanical key operation to lock and unlock the glove compartment 14. Thus, the glove compartment 14 is easily locked and unlocked. Further, the vehicle 1 may be driven with only the ID card 22 and without the portable remote controller 28 on hand. In such a state, conditions are imposed on the driving of the vehicle 1. However, since the vehicle 1 can be driven with just the ID card 22, this structure may be used for various applications.

The third embodiment has the advantages described below in addition to the advantages of the first and second embodiments.

(13) The electric lock 49 is used as the lock of the glove compartment 14. The glove compartment 14 is locked and unlocked through wireless communication performed with the portable remote controller 28. Thus, the glove compartment 14 is locked and unlocked without the need of performing an actual mechanical operation such as the insertion of the key into the key cylinder and the turning of the key. Accordingly, the glove compartment 14 is easily locked and unlocked.

(14) To start the engine 6, the portable remote controller 28 must be on hand or the ID card 22 must be set in the card receptacle 23. The engine 6 may be started with only the portable remote controller 28 or the ID card 22. Thus, the starting of the engine 6 is enabled even when only the ID card 22 is on hand.

It should be apparent to those skilled in the art that the present invention may be embodied in many other specific forms without departing from the spirit or scope of the invention. Particularly, it should be understood that the present invention may be embodied in the following forms.

In the above embodiments, the timing at which the ID card authentication (including the key transponder authentication) is started is not limited to the timing at which a switch signal of each corresponding switch is transmitted. For example, the ID card authentication may be started under the condition that the vehicle velocity becomes zero after the engine 6 is started and when the gearshift lever is arranged at the parking position. In this manner, the timing at which the authentication is started may be freely set.

In the above embodiments, the ID code authentication does not have to be determined as being unsuccessful just because the ID code authentication is unsuccessful once. For example, the above embodiments may additionally include a retry function for retrying the ID code authentication until the number of times the ID code matching is unsuccessful reaches a predetermined number.

In the above embodiments, the communicable data medium is not limited to the ID card 22. The communicable data medium may be any medium of which ID can be transmitted through wireless communication and may be formed to have any shape.

In the above embodiments, the ID card authentication performed between the vehicle 1 and the ID card 22 is not limited to the transponder authentication and may be ID authentication performed through various wireless communications. The ID card authentication may be, for example, smart authentication in which the portable remote controller 28 receives a request and returns in response an ID to perform ID authentication.

In the above embodiments, the trunk lid 17 may be unlocked using the mechanical key 2 (the emergency key 48) regardless of the switch state of the trunk open cancel switch 19.

In the above embodiments, the opening of the trunk lid 17 through communication may be disabled when the trunk open cancel switch 19 is activated. For example, when the trunk open cancel switch 19 is activated, the opening of the trunk lid 17 may be disabled by smart communication performed with the portable remote controller 28, which receives a request and returns an ID in response, or by remote control communication performed by pushing a lock button or an unlock button of the portable remote controller 28.

In the first and second embodiments, the condition for enabling the driving of the vehicle 1 is not limited to the condition in which at least the ID authentication (the interior authentication and the key transponder authentication) of the vehicle keys (the mechanical key 2 and the portable remote controller 28) is successful. More specifically, the driving of the vehicle 1 may be enabled when the ID authentication of the vehicle key or the ID card authentication is successful.

In the second and third embodiments, the portable remote controller 28 is not limited to the smart key that receives a request from the vehicle 1 and returns in response the ID of the portable remote controller 28. For example, the portable remote controller 28 may be a wireless key for locking and unlocking the door lock device. In this case, the portable remote controller 28 may have a lock button and an unlock button pushed to lock and unlock a door lock device. Further, the electronic key is not limited to the portable remote controller 28 described in the above embodiments and may be a wearable key, such as a watch-like key having an ID transmission function.

In the second and third embodiments, the condition for starting the engine with the portable remote controller 28 may be the interior authentication or the key transponder authentication being successful.

In the second and third embodiments, the emergency key 48 may be eliminated. This eliminates the need for accommodating the emergency key 48 in the portable remote controller 28 and reduces the size of the portable remote controller 28.

In the first embodiment, the first transponder 8 arranged in the mechanical key 2 may be eliminated. More specifically, the first ID authentication is not limited to the interior authentication and the key transponder authentication and but may be key groove authentication in which the key groove 3a is authenticated. In this case, the key groove authentication is performed by determining whether the key groove 3a of the mechanical key 2 matches the key groove defined by the tumblers (first authentication part) of the key cylinder 4. When the groove matching is successful, the driving of the vehicle 1 is enabled.

In the third embodiment, the wireless communication between the glove compartment 14 and the portable remote controller 28 is not limited to wireless communication in which a signal is transmitted through a button operation. The wireless communication between the glove compartment 14 and the portable remote controller 28 may be smart communication in which an ID is returned in response to a request or transponder communication performed with a transponder. Further, the glove compartment 14 may be formed, for example, to be automatically locked when the glove compartment 14 is closed.

In the above embodiments, the location at which the ID card 22 is held is not limited to the inside of the glove compartment 14. The ID card 22 may be held at any hidden or inconspicuous location, for example, in a center cluster or a center console of the passenger compartment.

In the above embodiments, the operation subject to which the key system is applied is not limited to a vehicle. The key system may be applied for various operation subjects, such as a door lock device for a house.

The present examples and embodiments are to be considered as illustrative and not restrictive, and the invention is not to be limited to the details given herein, but may be modified within the scope and equivalence of the appended claims.

What is claimed is:

1. A key system for a vehicle having a plurality of functions, the key system comprising:
    an electronic key, wherein the electronic key includes a unique key code, a key insertion groove, and a mechanical emergency key accommodated in the key insertion groove of the electronic key;
    a portable communicable data medium that stores a medium code and transmits the medium code through wireless communication, wherein the communicable data medium includes an accommodation structure that accommodates the mechanical emergency key of the electronic key;
    a first authentication part that performs first authentication for determining whether or not the unique key code of the electronic key is registered in the vehicle;
    a wireless signal receiver that receives through wireless communication the medium code unique to the portable communicable data medium held in a holding mechanism in a lockable accommodation case that is lockable and unlockable with the electronic key;
    a second authentication part that performs second authentication for determining whether or not the medium code of the portable communicable data medium held in the holding mechanism in the lockable accommodation case received by the wireless signal receiver is registered in the vehicle; and
    a condition-imposing part for limiting operative functions of the vehicle, wherein the condition imposing part is arranged to permit the vehicle to operate in a state in which a first group of at least one function is operative when the first authentication and the second authentication both generate an affirmative result and to permit the vehicle to operate in a state in which a second group of at least one function that is more limited than the first group of at least one function is operative when either one of the first authentication and the second authentication generates an affirmative result, and to permit an engine of the vehicle to be started and driven when the first authentication generates an affirmative result but the second authentication generates a negative result.

2. The key system according to claim 1, wherein the condition-imposing part permits the vehicle to operate in a conditional manner when the first authentication generates an affirmative result but the second authentication generates a negative result.

3. The key system according to claim 1, wherein the holding mechanism removably holds the communicable data medium.

4. The key system according to claim 3, further comprising:
    a detector for detecting that the communicable data medium is being held by the holding mechanism; and
    a communication control part for starting wireless reception of the medium code in response to a detection signal from the detector indicating that the communicable data medium is held by the holding mechanism.

5. The key system according to claim 4, wherein:
    the communication control part transmits, from a wireless signal transmitter, a drive radio wave for driving the communicable data medium in response to the detection signal indicating that the communicable data medium is held by the holding mechanism; and
    the communicable data medium storing the medium code is activated in response to the drive radio wave, uses the drive radio wave as a power supply, and transmits the medium code to the vehicle.

6. The key system according to claim 1, wherein:
    the electronic key includes a memory in which the key code is registered and transmits the key code to the vehicle through wireless communication; and
    the first authentication is wireless communication authentication for determining whether the key code received through wireless communication is registered in the vehicle.

7. The key system according to claim 6, wherein:
    the mechanical emergency key includes a key plate with a key groove;
    the vehicle includes a key cylinder rotated when receiving the key plate of the mechanical emergency key; and
    the mechanical emergency key enables a function of the vehicle that is inoperative through wireless communication with the electronic key to be operative.

8. The key system according to claim 1, wherein:
    the accommodation case is unlocked when the result of the first authentication is affirmative.

9. An electronic key system for a vehicle, comprising:
    a portable electronic key for transmitting a key code through wireless communication, wherein the electronic key includes a key insertion groove and a mechanical emergency key accommodated in the key insertion groove of the portable electronic key;
    a removable data storage medium having a data communication function, independent from the portable electronic key, for storing a medium code and for transmitting the medium code through wireless communication, wherein the removable data storage medium includes an accommodation structure for accommodating the mechanical emergency key of the portable electronic key;

a media reader, arranged in a lockable accommodation case that is lockable and unlockable with the mechanical emergency key in a passenger compartment of the vehicle, for receiving the removable data storage medium; and a controller arranged in the vehicle;

wherein the controller performs a first determination for determining whether or not the key code received through wireless communication is authorized and a second determination for determining whether or not the medium code received from the removable data storage medium received in the media reader in the lockable accommodation case is authorized;

the controller enables unconditional use of the vehicle when the first determination and the second determination are both affirmative;

the controller enables conditional use of the vehicle but permits an engine of the vehicle to be started and driven when the first determination is affirmative and the second determination is negative; and the controller disables use of the vehicle when the first determination is negative.

10. The key system according to claim 9, wherein the lockable accommodation case is a lockable glove compartment.

11. The key system according to claim 9, wherein:

the removable data storage medium transmits the medium code through wireless communication when received in the media reader but does not transmit the medium code through wireless communication when removed from the media reader.

12. The key system according to claim 1, wherein the mechanical emergency key includes a key plate and the accommodation structure of the communicable data medium includes a key insertion groove shaped in correspondence with the key plate of the emergency key of the electronic key.

13. The key system according to claim 9, wherein the mechanical emergency key includes a key plate and the accommodation structure of the removable data storage medium includes a key insertion groove shaped in correspondence with the key plate of the mechanical emergency key of the electronic key.

14. An electronic key system for a vehicle, comprising:

a portable electronic key that transmits a key code through wireless communication, wherein the electronic key includes a key insertion groove and a mechanical emergency key accommodated in the key insertion groove of the portable electronic key;

a removable data storage medium that stores a medium code and transmits the medium code through wireless communication, wherein the removable data storage medium includes a key insertion groove for accommodating the mechanical emergency key of the portable electronic key;

a media reader for receiving the removable data storage medium, wherein the media reader is arranged in a lockable accommodation case in a passenger compartment of the vehicle, wherein the lockable accommodation case is lockable and unlockable with the mechanical emergency key but is not lockable and unlockable with the portable electronic key; and a controller arranged in the vehicle, wherein the controller performs a first determination for determining whether or not the key code received through wireless communication is authorized and a second determination for determining whether or not the medium code received from the removable data storage medium received in the media reader in the lockable accommodation case is authorized;

the controller enables unconditional use of the vehicle when the first determination and the second determination are both affirmative;

the controller enables conditional use of the vehicle but permits an engine of the vehicle to be started and driven when the first determination is affirmative and the second determination is negative.

* * * * *

UNITED STATES PATENT AND TRADEMARK OFFICE
CERTIFICATE OF CORRECTION

PATENT NO. : 8,237,542 B2
APPLICATION NO. : 11/880696
DATED : August 7, 2012
INVENTOR(S) : Toshiharu Katagiri It is certified that error appears in the above-identified patent and that said Letters Patent is hereby corrected as shown below:

Title Page

"(73) Assignee: Kabushiki Kaisha Tokai Denki Seisakusho, Aichi (JP)"

Should be:

-- (73) Assignee: Kabushiki Kaisha Tokai Rika Denki Seisakusho, Aichi (JP) --

Signed and Sealed this
Thirtieth Day of October, 2012

David J. Kappos
*Director of the United States Patent and Trademark Office*